US010038769B2

(12) United States Patent
Ukai et al.

(10) Patent No.: US 10,038,769 B2
(45) Date of Patent: *Jul. 31, 2018

(54) SOUND EMISSION AND COLLECTION DEVICE, AND SOUND EMISSION AND COLLECTION METHOD

(71) Applicant: YAMAHA CORPORATION, Hamamatsu-shi (JP)

(72) Inventors: Satoshi Ukai, Hamamatsu (JP); Takashi Yamakawa, Iwata (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,321

(22) Filed: Sep. 14, 2017

(65) Prior Publication Data
US 2018/0007186 A1 Jan. 4, 2018

Related U.S. Application Data

(63) Continuation of application No. 15/304,159, filed as application No. PCT/JP2015/061520 on Apr. 14, 2015, now Pat. No. 9,807,215.

(30) Foreign Application Priority Data

Apr. 14, 2014 (JP) ................................. 2014-083209

(51) Int. Cl.
*H04M 1/60* (2006.01)
*H04M 9/08* (2006.01)
*H04M 1/62* (2006.01)

(52) U.S. Cl.
CPC ....... *H04M 1/6033* (2013.01); *H04M 1/6016* (2013.01); *H04M 1/62* (2013.01); *H04M 9/082* (2013.01); *H04M 2203/509* (2013.01)

(58) Field of Classification Search
CPC ................. H04M 1/6033; H04M 1/62; H04M 2203/509; H04M 9/082; H04M 1/6016
See application file for complete search history.

(56) References Cited

U.S. PATENT DOCUMENTS 9,807,215 B2 * 10/2017 Ukai ................... H04M 1/6033
2005/0286713 A1 12/2005 Gunn et al.
(Continued)

FOREIGN PATENT DOCUMENTS

JP S64029094 A 1/1989
JP H09247788 A 9/1997
(Continued)

OTHER PUBLICATIONS

Extended European Search Report issued in European Appln. No. 15779431.4 dated Nov. 8, 2017.
(Continued)

*Primary Examiner* — Harry S Hong
(74) *Attorney, Agent, or Firm* — Rossi, Kimms & McDowell LLP

(57) ABSTRACT

A sound emission and collection device includes a speaker, a filter processing a sound emission signal, microphones, echo cancellers cancelling regression sound signals of the sound emitted by the speaker from the sound collection signals of the corresponding microphones, a first integration section integrating adaptive filter coefficients taken out from the plurality of echo cancellers, a reverberation time estimation section estimating the reverberation time for each frequency band in the space in which the speaker and the plurality of microphones are present on the basis of the integrated adaptive filter coefficient, and an arithmetic operation section specifying a frequency band having a long reverberation time from the sound emission signal based on the estimated reverberation time, calculating a filter coeffi-
(Continued)

cient for suppressing power of the specified frequency band, and setting the filter coefficient to the filter.

20 Claims, 10 Drawing Sheets

(56) References Cited

U.S. PATENT DOCUMENTS

| | | |
|---|---|---|
| 2007/0263850 A1 | 11/2007 | Stokes et al. |
| 2010/0165071 A1 | 7/2010 | Ishibashi et al. |
| 2011/0268283 A1 | 11/2011 | Nakadai et al. |
| 2012/0221329 A1* | 8/2012 | Harsch .................... H04R 3/02 704/225 |
| 2013/0188799 A1 | 7/2013 | Otani et al. |
| 2013/0230184 A1 | 9/2013 | Kuech et al. |
| 2015/0016622 A1 | 1/2015 | Togami et al. |
| 2015/0063579 A1 | 3/2015 | Bao et al. |
| 2015/0350781 A1 | 12/2015 | Otani et al. |

FOREIGN PATENT DOCUMENTS

| | | |
|---|---|---|
| JP | H10150343 A | 6/1998 |
| JP | 2013150250 A | 8/2013 |
| KR | 1020130117795 A | 10/2013 |

OTHER PUBLICATIONS

International Search Report issued in Intl. Appln. No. PCT/JP2015/061520 dated Jun. 9, 2015.
Written Opinion issued in Intl. Appln. No. PCT/JP2015/061520 dated Jun. 9, 2015.
Office Action issued in Korean Appln. No. 10-2016-7028694 dated Jul. 7, 2017.
Office Action issued in U.S. Appl. No. 15/304,159 dated Dec. 16, 2016.
Notice of Allowance issued in U.S. Appl. No. 15/304,159 dated Jun. 28, 2017.

* cited by examiner

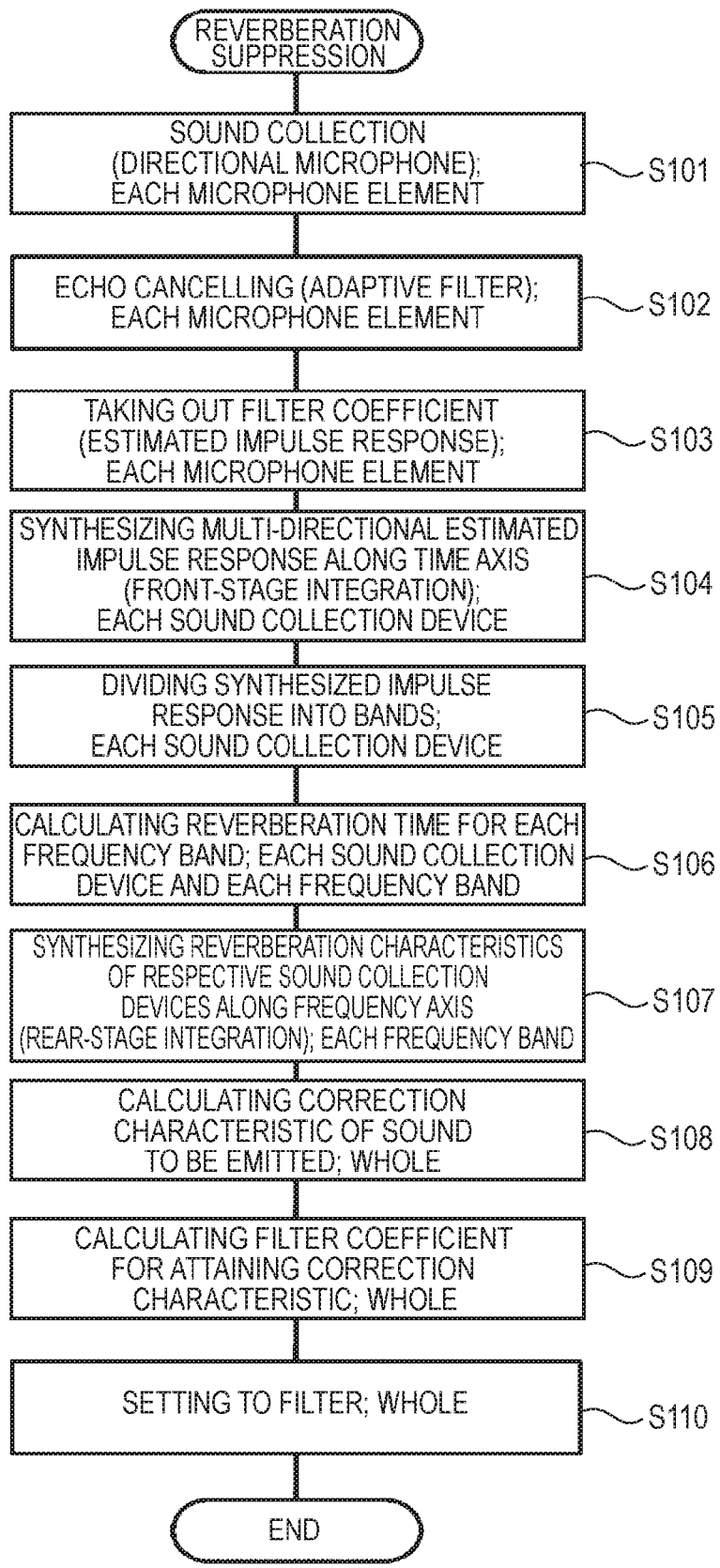

SOUND EMISSION AND COLLECTION DEVICE, AND SOUND EMISSION AND COLLECTION METHOD

TECHNICAL FIELD

The present invention relates to a sound emission and collection device for use, for example, in remote voice conferences, and more particularly, to the suppression of the reverberation of sound to be emitted.

BACKGROUND ART

A voice conference system for transmitting and receiving sound via a network making connection between sites has been put into practical use. The acoustic characteristic of a conference room to be used for conferences is different variously, and a conference is sometimes held in a room having a very long reverberation time. In the case that the reverberation time is long, the articulation of the sound to be emitted from a speaker deteriorates. To solve this problem, a device for suppressing the reverberation of the sound to be emitted has been proposed (Patent Document 1).

The device according to Patent Document 1 discloses that, by the operation of the key Kia corresponding to a participant Ma, the inverse filter coefficient Ga of the spatial transmission function Ha in the space ranging from the participant Ma to a microphone 31 is read from a ROM 41 and supplied to a digital filter 34$i$ and this digital filter 34$i$ performs inverse filter arithmetic operation in real time, thereby inversely filtering the sound signal of the participant Ma. In other words, with this device, the spatial transmission functions in the spaces ranging from the seats of respective participants Ma to Mn to a plurality of microphones 31 have been measured in advance, and the inverse filter coefficients Ga to Gn of the respective transmission functions have been stored in advance in the ROM 41.

PRIOR ART DOCUMENT

Patent Document

Patent Document 1: JP-A-09-247788

SUMMARY OF INVENTION

Technical Problem

However, since an impulse response is required to be measured in advance in the above-mentioned conventional device, it is necessary to reproduce a test signal immediately before the start of a conference or to reproduce the test signal in the middle of the conference; hence, a quiet environment is required to be made in the conference room during the reproduction of the test signal, whereby a smooth progress of the conference is hindered.

Although it is conceivable that the reproduction should be performed before the entry of the participants of the conference, since the acoustic characteristic of the conference room changes depending on whether the participants are present or not present in the conference room, it is preferable that the test signal should be reproduced in a state in which the participants are present.

An object of the present invention is to provide a sound emission and collection device and a sound emission and collection method capable of suppressing reverberation by using sound collection and echo cancelling functions for conferences without reproducing test sound in advance.

Means for Solving the Problems

In order to achieve the above-mentioned object, a sound emission and collection device according to the present invention includes a speaker; a filter configured to process a sound emission signal serving as a sound signal to be supplied to the speaker; a plurality of microphones, a plurality of echo cancellers provided so as to respectively correspond to the plurality of microphones and configured to cancel regression sound signals of the sound emitted by the speaker from the sound collection signals of the corresponding microphones; a first integration section configured to integrate adaptive filter coefficients taken out from the plurality of echo cancellers; a reverberation time estimation section configured to estimate the reverberation time for each frequency band in the space in which the speaker and the plurality of microphones are present on the basis of the integrated adaptive filter coefficient; and an arithmetic operation section configured to specify a frequency band having a long reverberation time from the sound emission signal on the basis of the estimated reverberation time, to calculate a filter coefficient for suppressing power of the specified frequency band, and then to set the filter coefficient to the filter.

Furthermore, a sound emission and collection method according to the present invention includes processing a sound emission signal serving as a sound signal to be supplied to a speaker by a filter; canceling regression sound signals of the sound emitted by the speaker from the sound collection signals of a plurality of microphones by using a plurality of echo cancellers provided so as to respectively correspond to the plurality of microphones; integrating adaptive filter coefficients taken out from the plurality of echo cancellers; estimating the reverberation time for each frequency band in the space in which the speaker and the plurality of microphones are present on the basis of the integrated adaptive filter coefficient; and specifying a frequency band having a long reverberation time from the sound emission signal on the basis of the estimated reverberation time, calculating a filter coefficient for suppressing the power of the specified frequency band, and setting the filter coefficient to the filter.

Advantage of the Invention

With the present invention, reverberation can be suppressed properly by using directional microphones suited for conferences and by utilizing parameters (for example, the filter coefficients of adaptive filters) of echo cancellers.

BRIEF DESCRIPTION OF THE DRAWINGS

FIG. 8 is a view showing the flow of a reverberation suppressing process;

MODE FOR CARRYING OUT THE INVENTION

Figure 1:
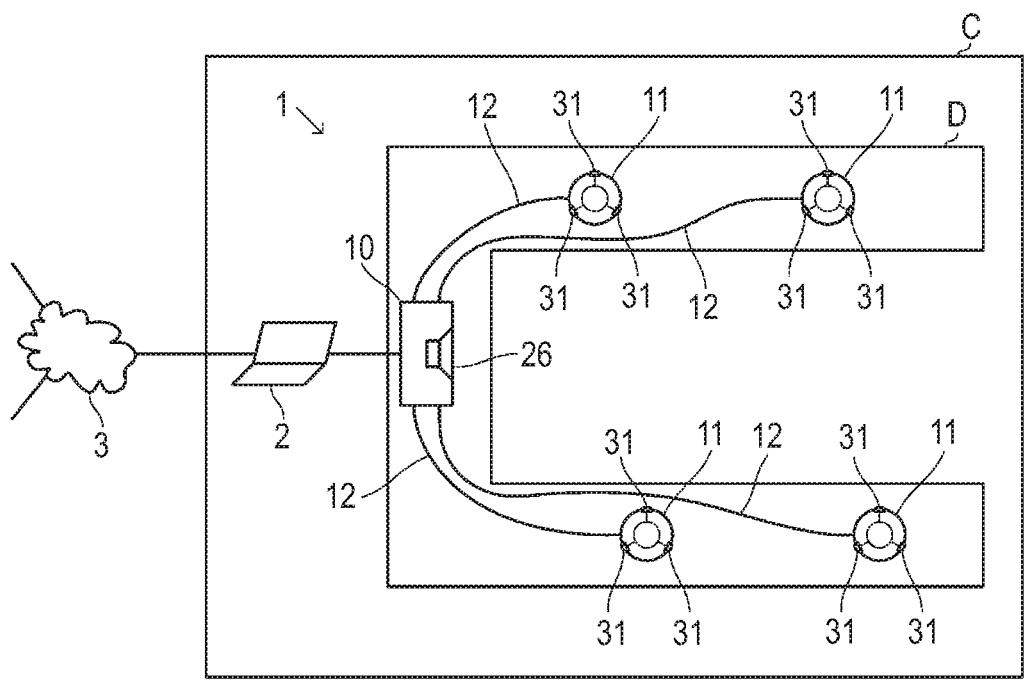
FIG. 1 is a view showing an example of an installation configuration of a voice conference system according to an embodiment of the present invention.

A voice conference system according to an embodiment of the present invention will be described referring to the drawings. FIG. 1 is a view showing an example of an installation configuration of the voice conference system according to the embodiment of the present invention.

A voice conference system 1 is installed on the conference desk D of a conference room C. The voice conference system 1 has one communication device 10 and one or more sound collection devices 11 (four devices in this embodiment). The communication device 10 has a speaker 26. The sound collection device 11 includes a plurality of microphone elements 31. The communication device 10 and the sound collection devices 11 are mutually connected via communication cables 12 to perform digital communication. The sound collection device 11 transmits sound signals collected by the microphone elements 31 and the filter coefficients of echo cancellers 32 (refer to FIG. 3) to the communication device 10. The communication device 10 is connected to a personal computer 2 serving as a host apparatus. The personal computer 2 communicates with another voice conference system installed in another site via a network 3 such as the Internet, thereby transmitting the sound signal (collected by the microphone elements 31) input from the communication device 10 of the voice conference system 1 to the other voice conference system and inputting the sound signal received from the other voice conference system to the communication device 10. From the speaker 26, the communication device 10 emits the sound signal transmitted from the other voice conference system.

Figure 2:
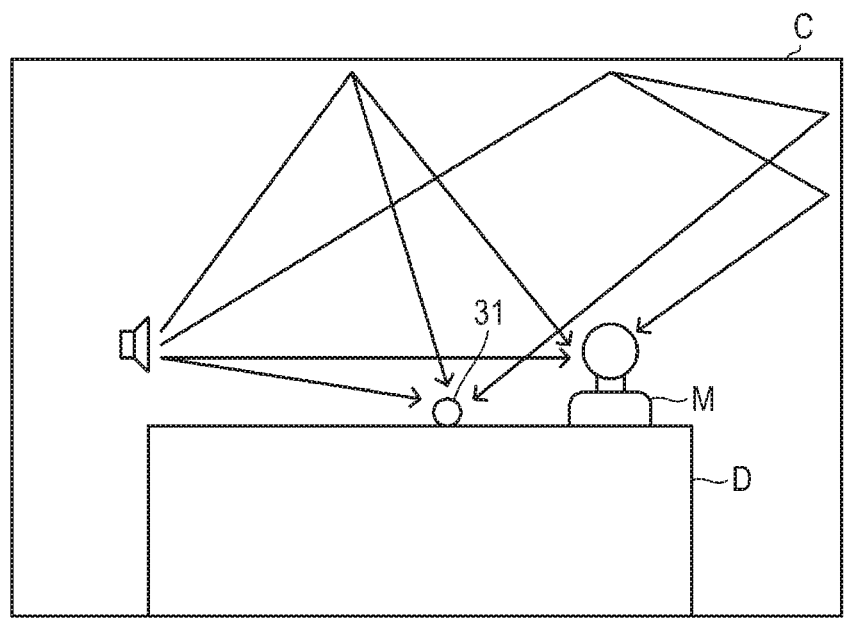
FIG. 2 is a view illustrating the state of sound reflection in a conference room.

FIG. 2 is a view illustrating the state of sound reflection in the conference room C. The sound emitted from the speaker 26 directly reaches a conference participant M and the microphone elements 31 and is reflected variously by the walls and the ceiling of the conference room C and then reaches the participant M and the microphone elements 31.

If the sound emitted from the speaker 26, that is, the sound collected by the other voice conference system installed at the other side, is collected by the microphone elements 31 and transmitted to the other voice conference system, the transmitted sound is returned and reproduced, whereby a so-called echo is generated. In order to prevent this echo, the echo canceller 32 (refer to FIG. 3), for canceling the sound emitted from the speaker 26, is connected to each microphone element 31. Furthermore, the sound emitted from the speaker 26 becomes indistinct due to reverberation reflected by the walls and the ceiling of the conference room C and the deterioration in the articulation of the sound occurs; to improve the deterioration, the communication device 10 is provided with a filter 24 (refer to FIG. 6) for suppressing reverberation. The filter coefficient of this filter 24 is calculated using the filter coefficient of the adaptive filter 35 (refer to FIG. 5) of the echo canceller 32.

The functions and operations of the echo canceller 32 and the filter 24 for suppressing reverberation will be described later referring to FIG. 3 and the following figures. The function sections built in the communication device 10 and the sound collection device 11, to be described below, may be composed of electronic circuits, or may be achieved by the cooperation of a processor, such as a computer, and programs.

Figure 3:
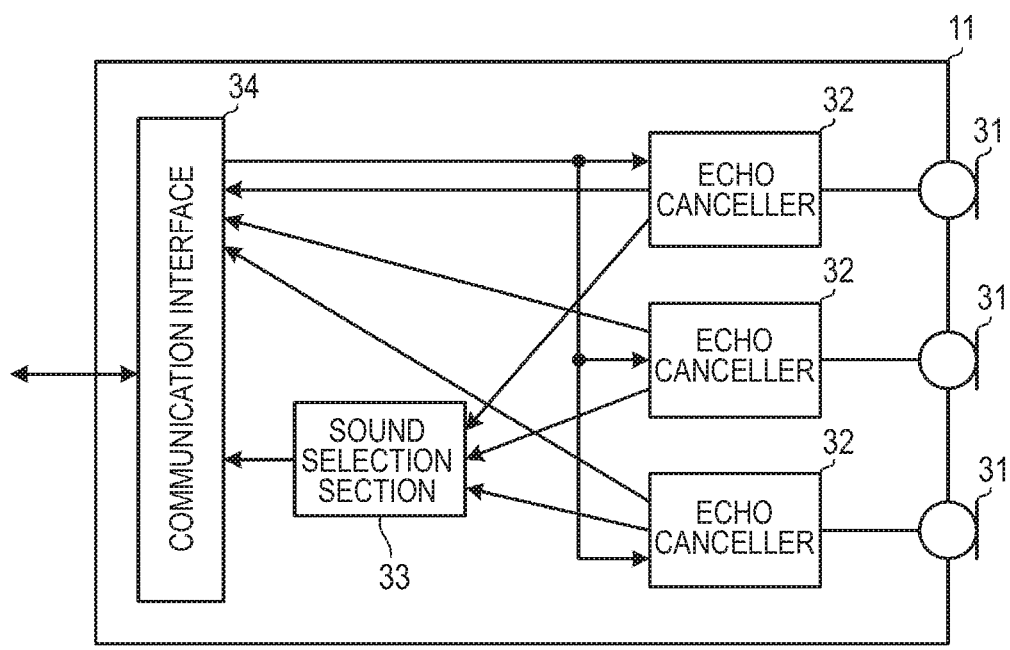
FIG. 3 is a block diagram showing the sound collection device of the voice conference system.
Figure 4:
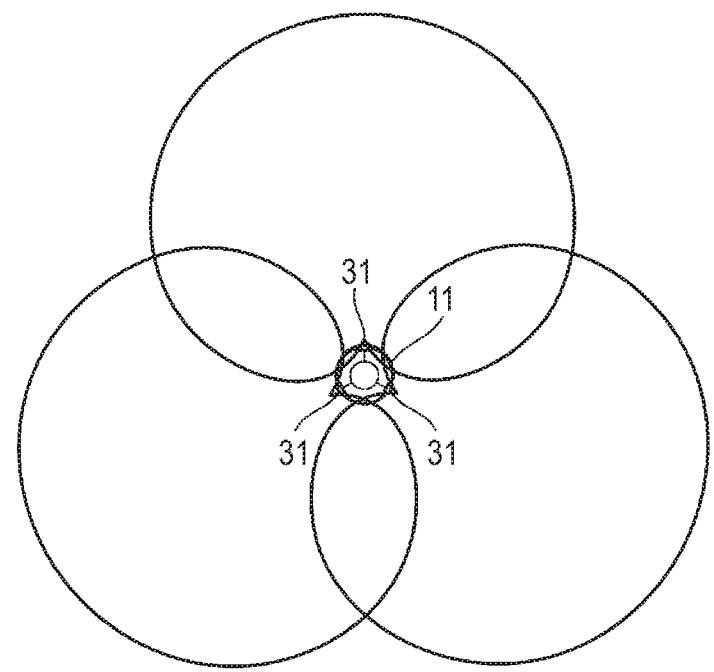
FIG. 4 is a view showing the directivity characteristics of the microphones of the sound collection device of the voice conference system.
Figure 5:
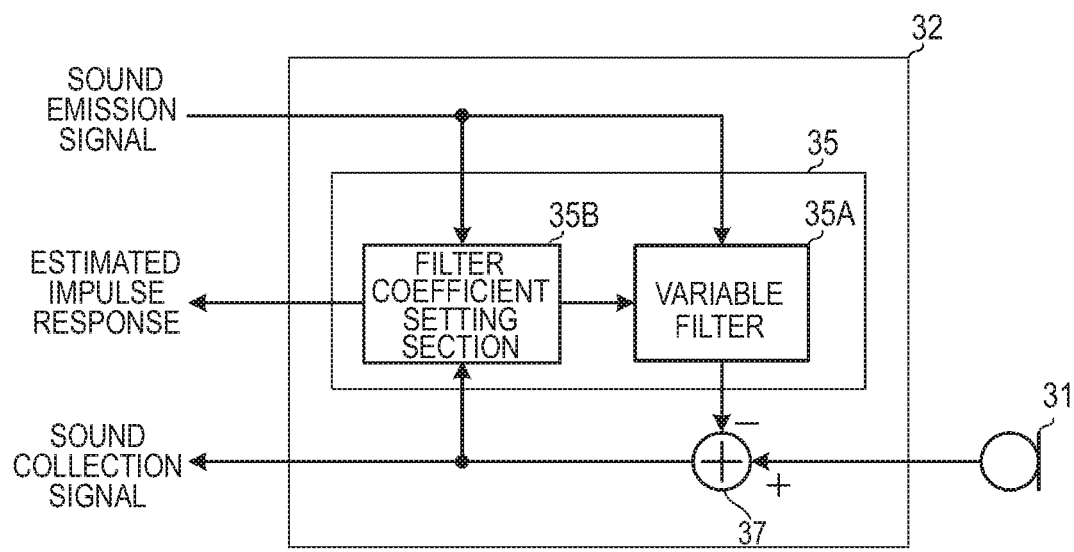
FIG. 5 is a block diagram showing the echo canceller of the sound collection device.

FIG. 3 is a block diagram showing the sound collection device 11. FIG. 4 is a view showing the directivity characteristics of the three microphone elements 31 of the sound collection device 11. FIG. 5 is a block diagram showing the echo canceller 32 of the sound collection device 11.

The sound collection device 11 includes the three microphone elements 31. As shown in FIG. 1 and FIG. 4, the sound collection device 11 has a disc-like flat shape, and the three microphone elements 31 are radially provided outward (in the normal direction) at intervals of 120 degrees on the circumference thereof. Each microphone element 31 is a unidirectional microphone and has a cardioid-shaped sound collecting characteristic centered in the direction in which the microphone element 31 is oriented. Since the respective microphone elements 31 are provided at intervals of 120 degrees and their directivity characteristics are disposed as shown in FIG. 4, an almost non-directional signal is obtained by synthesizing the sound collection signals of the respective microphone elements 31. However, the microphone element 31 is not limited to a microphone element having the cardioid-shaped directivity characteristic. The microphone element 31 may have slight backward directivity or may have bi-directivity.

In FIG. 3, each microphone element 31 is provided with the echo canceller 32. The echo canceller 32 cancels the sound emitted from the speaker 26 from among the sound signals collected by the microphone element 31; the detailed configuration of the echo canceller 32 is described referring to FIG. 5. The sound signal in which the sneaking sound around the speaker 26 is canceled by the echo canceller 32 is input to a sound selection section 33. The sound signals collected by the three microphone elements 31 are respectively input to the sound selection section 33. On the basis of the levels, durations, etc. of the three sound signals having been input, the sound selection section 33 estimates which one of the microphone elements 31 has input the sound signal having the highest level, that is, estimates which sound signal is assumed to be the speech sound signal of a speaking person, thereby selecting the single sound signal estimated as the speech sound signal. In other words, in the sound collection of the sound signal in a conference, one optimal microphone element 31 is selected from among the three microphone elements 31 by using the characteristics of directional microphones, whereby the speech sound with a high S/N ratio is collected. The selected sound signal is transmitted to the communication device 10 via a communication interface 34. In the case that a plurality of sound collection devices 11 is connected to the communication device 10, the communication device 10 (a mic mixer 22, refer to FIG. 6) compares the sound signals received from the respective sound collection devices 11 with respect to the level, duration and correlation degree of the sound signals and selects one of the sound signals or mixes the sound signals, thereby transmitting the selected sound signal or the mixed sound signal to a mating system.

Next, the configuration of the echo canceller 32 will be described referring to FIG. 5. FIG. 5 is a block diagram showing the echo canceller 32. The echo canceller 32 has an adaptive filter 35 composed of a filter coefficient setting section 35B and a variable filter 35A and also has an adder 37. Generally, an adaptive filter is a filter in which its transmission function (adaptive filter coefficient sequence) is automatically adapted according to a predetermined optimization algorithm.

The filter coefficient setting section 35B estimates the transmission function of the acoustic transmission system (the acoustic propagating route ranging from the speaker 26 to the microphone elements 31) of the conference room C and sets a filter coefficient to the variable filter 35A so that the filter has the estimated transmission function.

The sound signal (sound emission signal) emitted from the speaker 26 is input to the variable filter 35A. Since the transmission function of the variable filter 35A is the transmission function obtained by simulating the acoustic transmission system (the acoustic propagating route ranging from the speaker 26 to the microphone element 31) of the conference room C, the sound emission signal filtered by the variable filter 35A is a sound signal (pseudo regression sound signal) obtained by simulating the sound signal (regression sound signal) emitted from the speaker 26, propagated in the conference room C and collected by the microphone element 31. This pseudo regression sound signal is input to the adder 37.

Furthermore, the sound signal (sound collection signal) collected by the microphone element 31 is input to the adder 37. The adder 37 subtracts the pseudo regression sound signal from the sound collection signal and outputs the obtained signal. The sound collection signal includes the speech sound signal of the participant M of the conference and the regression sound signal emitted from the speaker 26 and sneaking therearound. The adder 37 subtracts the pseudo regression sound signal from the sound collection signal, thereby being capable of eliminating the regression sound from the sound collection signal, in other words, canceling echo. The sound collection signal in which the echo is canceled is input to the sound selection section 33 and is also input to the filter coefficient setting section 35B as a reference signal. In addition, the sound emission signal serving as the sound signal emitted from the speaker 26 as another reference signal is also input to the filter coefficient setting section 35B. The filter coefficient setting section 35B continuously renews the filter coefficient on the basis of these reference signals. Furthermore, a time period in which a sound is emitted from the speaker 26 and the participant M in the conference room C is not speaking is automatically detected, and the renewal of the filter coefficient is performed by using the reference signals obtained in the time period.

The variable filter 35A herein serves as an FIR filter. Hence, the filter coefficient to be set to the variable filter 35A is obtained by estimating and simulating the impulse response of the acoustic propagating route ranging from the speaker 26 to the microphone element 31 using the filter coefficient setting section 35B. The filter coefficient setting section 35B transmits the filter coefficient to the communication device 10 via the communication interface 34 as an estimated impulse response.

As described above, one of the sound signals collected by the respective three microphone elements 31 is selected by the sound selection section 33 and transmitted to the communication device 10; however, the three estimated impulse responses corresponding to the three microphone elements 31 are also transmitted to the communication device 10. These three estimated impulse response are synthesized in the parameter estimation section 23 of the communication device 10 as described later. The three estimated impulse responses are impulse responses containing reverberation components arriving from the directions in which the corresponding microphone elements 31 are oriented as shown in FIG. 4; hence, the impulse responses arriving from all the directions in the conference room C and collected by the non-directional microphones, containing the reverberation components arriving from all the directions, can be simulated by synthesizing the three estimated impulse responses.

Figure 6:
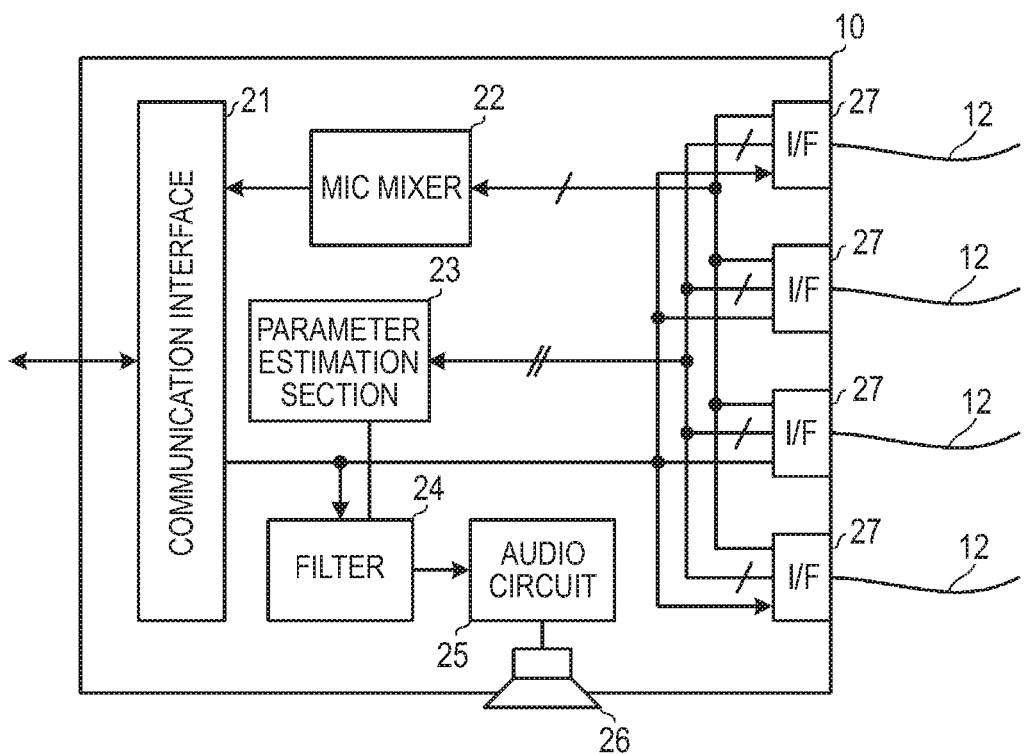
FIG. 6 is a block diagram showing the communication device of the voice conference system.

FIG. 6 is a block diagram showing the communication device 10. The communication device 10 includes a communication interface 21 for communicating with the personal computer 2, the mic mixer 22, the parameter estimation section 23, the filter 24, an audio circuit 25, the speaker 26, and communication interfaces 27 for communicating with the sound collection devices 11. The communication interface 21 is an interface for digitally communicating with the personal computer 2; for example, a USB interface is used as the interface. In the case that the USB interface is used, the personal computer serves as a host and the communication device 10 serves as an audio device. The communication interfaces 27 are provided in plural numbers, and the individual sound collection devices 11 are respectively connected thereto via the cables 12. A wired LAN interface, for example, may merely be used as the communication interface 27.

The communication device 10 receives the sound signals (the sound collection signals in which echoes are canceled) and the three estimated impulse responses from the sound collection devices 11 via the communication interfaces 27. The received sound signals are input to the mic mixer 22. The sound signals being plural in number and having been received from the respective sound collection devices 11 are input to the mic mixer 22 through the plurality of communication interfaces 27. The mic mixer 22 selects one of the sound signals received from the plurality of sound collection devices 11 or mixes the sound signals, thereby obtaining a monaural sound signal and then transmitting the obtained sound signal to the personal computer 2 via the communication interface 21. The personal computer 2 transmits this sound signal to the voice conference system in the other site via the network 3. The mic mixer 22 may merely compare the sound signals of the communication device 10 with respect to the level, duration or correlation degree and select the sound signal having a high S/N ratio as a speech sound to be transmitted to the mating system.

Furthermore, the personal computer 2 receives the sound signal transmitted from the voice conference system in the other site. This sound signal is input via the communication interface 21 and is further input to the filter 24 so as to serve as the sound emission signal to be emitted from the speaker 26, and the sound signal is transmitted to the respective sound collection devices 11 via the communication interfaces 27.

The filter 24 performs filtering so as to suppress the deterioration in the articulation of the sound due to reverberation in the conference room C. In other words, the filter performs signal processing for the sound emission signal so as to suppress the level of a frequency band having a long reverberation time. In particular, since the reverberation in the low frequency sound range causes the deterioration in the articulation, the degree of the suppression is made high for the low frequency sound range. The filter coefficient for use in this kind of processing is determined by the parameter estimation section 23. The sound emission signal in which the frequency band having the long reverberation time is suppressed by the filter 24 is input to the audio circuit 25. The audio circuit 25 converts the sound emission signal into an analog sound signal, amplifies the signal to a predetermined level and inputs the obtained signal to speaker 26. The speaker 26 emits this sound emission signal to the conference room C as a sound. The emitted sound is heard by the participant M of the conference and collected by the microphone elements 31.

The sound emission signal transmitted to the sound collection device 11 via the communication interface 27 is input to the filter coefficient setting section 35B of the echo canceller 32 shown in FIG. 5 as a reference signal.

Figure 7:
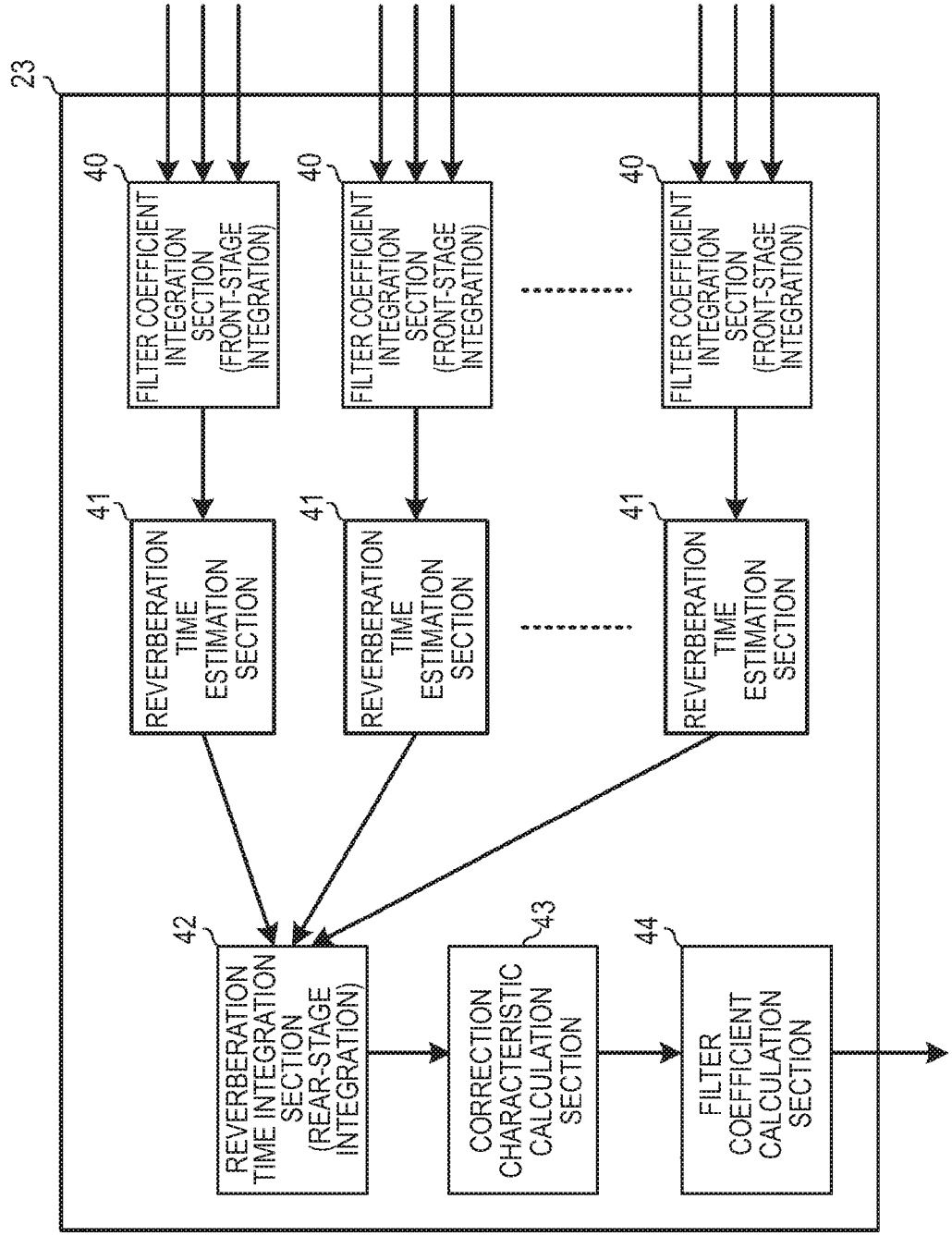
FIG. 7 is a function block diagram showing the parameter estimation section of the communication device.
Figure 9A:
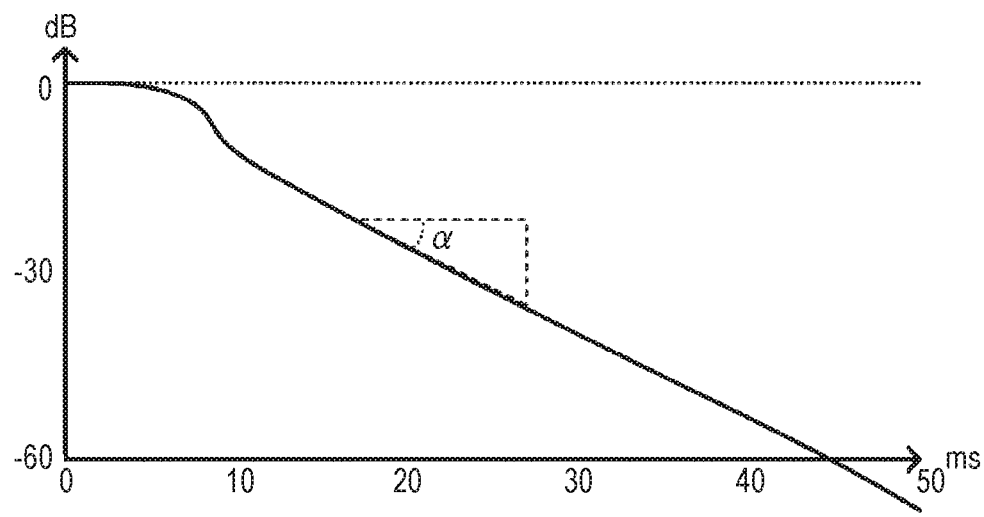
FIGS. 9(A) and 9(B) are views showing examples of signal waveforms appearing in the parameter estimation section.
Figure 9B:
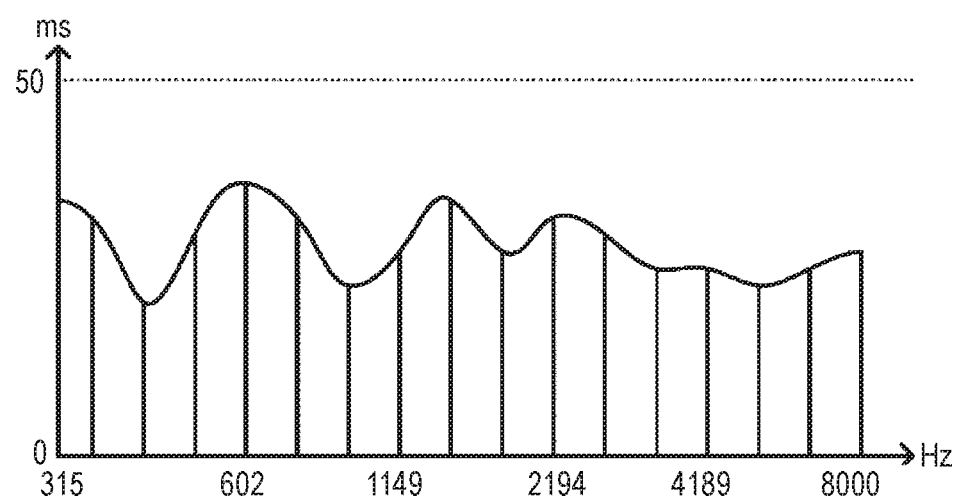

FIG. 7 is a block diagram showing the parameter estimation section 23. Furthermore, FIG. 8 is a view showing a reverberation suppressing processing procedure to be performed in the voice conference system 1 including the parameter estimation section 23. Moreover, FIGS. 9(A) and 9(B) are views showing examples of signal waveforms appearing in the reverberation suppressing processing procedure.

In FIG. 8, the sound collection device 11 performs sound collection (at S101) using the microphone elements 31 having directivity, performs echo cancelling (at S102) and takes out the filter coefficient (estimated impulse response) from the adaptive filter 35 (at S103). To the communication device 10, the sound collection device 11 transmits the filter coefficients of the three echo cancellers 32 respectively provided so as to correspond to the three microphone elements 31 as estimated impulse responses.

In FIG. 7, the parameter estimation section 23 includes filter coefficient integration sections 40 provided for the respective sound collection devices 11 to which they are connected; reverberation time estimation sections 41 also provided for the respective sound collection devices 11 to which they are also connected; a reverberation time integration section 42; a correction characteristic calculation section 43; and a filter coefficient calculation section 44.

The communication device 10 receives the three estimated impulse responses (filter coefficients) from each sound collection device 11. The received estimated impulse responses are input to the parameter estimation section 23. In the parameter estimation section 23, the estimated impulse responses having been input are respectively input to the filter coefficient integration sections 40 provided for each sound collection device 11. The filter coefficient integration section 40 synthesizes the three estimated impulse responses having been input with time axes aligned. This synthesis may be performed by simply carrying out addition, may be performed by changing the weighing of each estimated impulse response, or may be performed by correcting the time lag of each estimated impulse response. An impulse response (ideally, a 360-degree non-directional response) containing reverberation components arriving from a directional range wider than the range in the case of the estimated impulse response for a single microphone can be estimated by synthesizing the estimated impulse responses in the three directions shown in FIG. 4. This process is front-stage integration at S104 in FIG. 8. The process is performed for each sound collection device 11 being connected (to which the estimated impulse responses has been input), and the impulse responses at each sound collection device 11 are estimated.

The widely directional estimated impulse response synthesized by the filter coefficient integration section 40 is input to the reverberation time estimation section 41. The following processes are performed in the reverberation time estimation section 41. First, band division is performed by passing the estimated impulse response through a bandpass filter having a plurality of channels. The band division may merely be performed, for example, such that the band ranging from 315 Hz to 8000 Hz is divided into 15 channels although the number of channels to be divided and the frequency bands of the respective channels are arbitrary. With this process, the impulse response of the signal component in each frequency band (channel) is estimated. This process corresponds to the process at S105 in FIG. 8. The process is also performed for each sound collection device 11.

The reverberation time estimation section 41 determines the reverberation time of the signal in each frequency band on the basis of the estimated impulse response in each frequency band. Generally, the reverberation time is the time required for the level of a signal to attenuate to −60 dB (one-millionth); although various methods are available for the calculation and estimation of the reverberation time, Schroeder's method may merely be used to obtain the reverberation time. In Schroeder's method, such a Schroeder curve (reverberation attenuation curve) as shown in FIG. 9(A) may merely be obtained by subjecting the impulse response to Schroeder integration or rearward accumulative addition, and the time required for this curve to attenuate to −60 dB may merely be obtained. More simply, a predetermined zone not including the direct sound, error components, etc. of the Schroeder curve may merely be taken out and the inclination of the curve in the zone may merely be used as the inclination of the curve, and the inclination may merely be used to estimate the time required for the curve to attenuate from 0 dB to −60 dB. This process corresponds to S106 in FIG. 8 and is performed for each frequency band in each sound collection device 11, whereby the reverberation time for each frequency band at each sound collection device 11 is estimated.

The reverberation time for each frequency band at each sound collection device 11, estimated by each of the plurality of reverberation time estimation sections 41, is input to the reverberation time integration section 42. The reverberation time integration section 42 synthesizes the reverberation times at the respective sound collection devices 11 for each frequency band. This process is the rear-stage integration process at S107 in FIG. 8 and is performed for each frequency band.

Although the synthesis in the rear-stage integration process is performed by adding and averaging the reverberation times of the respective sound collection devices 11 for each frequency band, the reverberation times (outliers) extremely deviating from the average value may be excluded from the average calculation. Furthermore, in the case of the sound collection device 11 having many outliers, the sound collection device 11 is assumed to be installed at a place in which an unusual characteristic is apt to be obtained, for example, at a corner or the like of the room; hence, the reverberation times of the sound collection device 11 for all the frequency bands may be excluded completely from the rear-stage integration process. This excluding process may be performed according to the judgment of the communication device 10, or a person in charge of installing this system in the conference room C may perform manual operation for the sound collection devices 11 or the communication device 10 so that setting can be made so as to exclude a particular sound collection device 11, such as the above-mentioned sound collection device 11 installed at the corner of the room. In this case, the processes at S103 and the following steps are not necessary for the sound collection device 11 having been excluded from the objects to be subjected to the integration, whereby the whole processing is simplified and shortened.

For example, such an average reverberation characteristic in the entire conference room C as shown in FIG. 9(B) is obtained by plotting the reverberation times for the respective frequency bands obtained by the rear-stage integration process along a frequency axis. On the basis of this frequency characteristic, a judgment can be made to determine at which frequency band the reverberation time is long.

Figure 10:
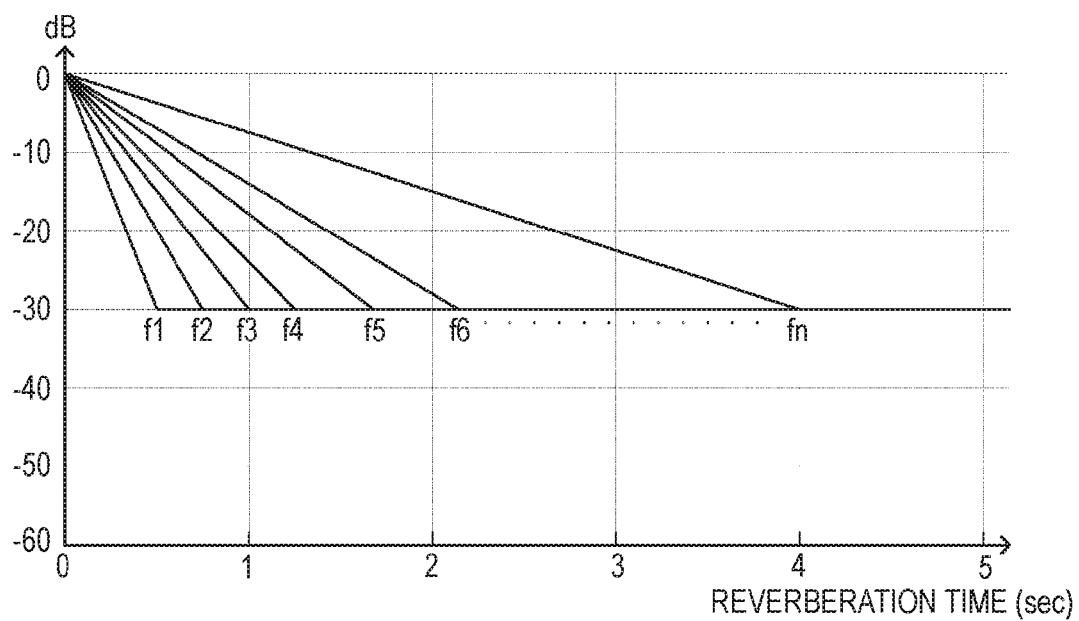
FIG. 10 is an example of the gain table of the correction characteristic calculation section of the communication device.

The reverberation characteristic obtained by the reverberation time integration section 42 is input to the correction characteristic calculation section 43. On the basis of the input reverberation characteristic, the correction characteristic calculation section 43 determines the correction characteristic for the frequency range so as to suppress a frequency band having a long reverberation time so that the sound emitted from the speaker 26 is not covered with the reverberation sound of the sound. Various methods, for example, a method in which the threshold value of the reverberation time for each frequency band is determined, a frequency band having a reverberation time exceeding the threshold value is extracted, and the power of this frequency band is suppressed, the known filtering method for suppressing reverberation sound, and a method for determining the power suppression amount for each frequency band by using a gain table for each frequency band, can be selectively used to determine the correction characteristic. Such a gain table as shown in FIG. 10 can be used as the gain table for each frequency band. In this gain table, the vertical axis represents gain (dB) and the horizontal axis represents reverberation time RT (sec), and the gain value for each frequency band is indicated by a line segment having an inclination. Line segments f1 to fn correspond to the frequency bands divided by the above-mentioned bandpass filter; f1 is located on the side of the low frequency sound range, and fn is located on the side of the high frequency sound range. For example, in the case that the reverberation time at the band f3 is 1.0 sec, the gain is determined to be −30 dB. In this gain table, the line segments in the low frequency sound range are set to have steeper inclinations. In the case that the reverberation time for f4 on the side of the high frequency range is 1.0 sec, the gain is approximately −24 dB. In the case that the reverberation time in the low frequency sound range is long as described above, a correction characteristic is determined so that suppression is performed in the low frequency sound range more intensively than in the case that the reverberation time in the high frequency sound range is long.

Figure 11:
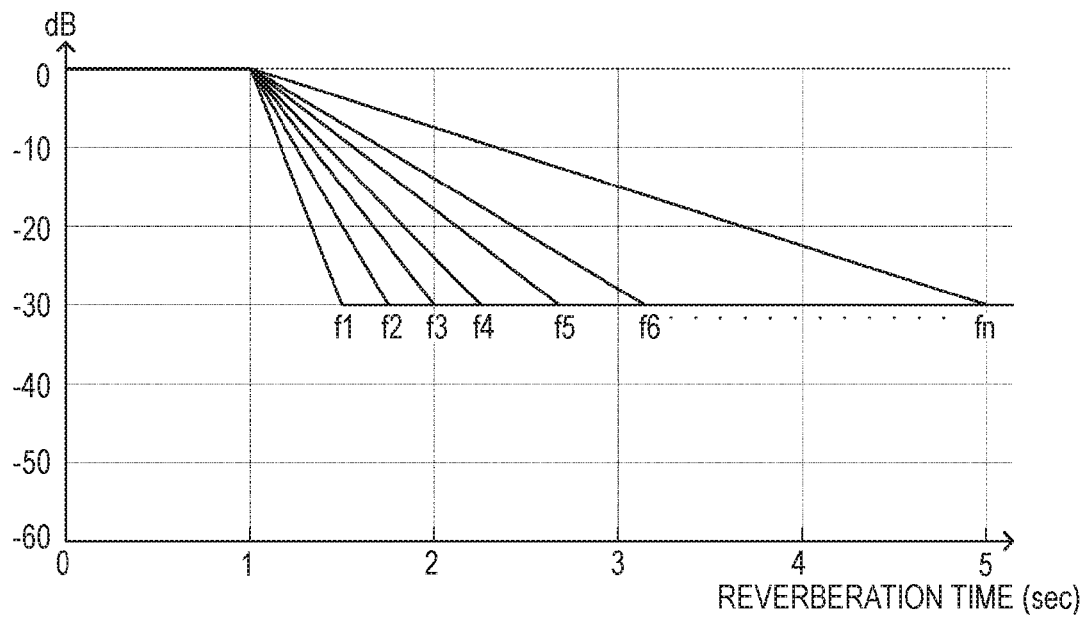
FIG. 11 is another example of the gain table.

The gain value has a lower limit, whereby suppression exceeding a predetermined value (−30 dB in the gain table shown in the figure) is not performed. Furthermore, in the case that the reverberation time in each frequency band exceeds a predetermined reverberation time (1.0 sec in f3), the lower limit value of the gain is applied. Moreover, in the gain table, the convergence point at which the line segments converge may be set so as to be shifted in the positive direction by a constant reverberation time as shown in FIG. 11. In the case of this figure, the gain is 0 dB when the reverberation time is 1.0 sec or less. This process corresponds to S108 in FIG. 8. The determined correction characteristic is input to the filter coefficient calculation section 44.

The filter coefficient calculation section 44 determines a filter coefficient so that the filter 24 has the correction characteristic having been calculated by the correction characteristic calculation section 43. The filter 24 is composed of an FIR filter or an IIR filter. The filter coefficient is calculated by a discrete-time inverse Fourier transformation or an arithmetic operation such as parametric peak filtering in accordance with the configuration of the filter 24. This process corresponds to S109 in FIG. 8. The calculated filter coefficient is set to the filter 24 (at S110). The reverberation of the sound emitted from the speaker 26 is suppressed and the sound becomes high in articulation for the participant M by filtering the sound emission signal using the filter 24.

In the above-mentioned embodiment, the reverberation characteristic of the conference room C is estimated using the filter coefficient of the echo canceller 32 and a frequency band having a long reverberation time is suppressed, whereby the articulation of the emitted sound is prevented from lowering. Furthermore, the frequency characteristic of the conference room C may be estimated using the filter coefficient of the echo canceller 32 and then the frequency characteristic of the sound emission signal may be corrected so as to cancel the frequency characteristic of the conference room C so that the emitted sound having a flat characteristic is heard. With this correction, not only the reverberation but also the deterioration in the articulation of the sound due to the frequency characteristic of the conference room C can be prevented.

Figure 12:
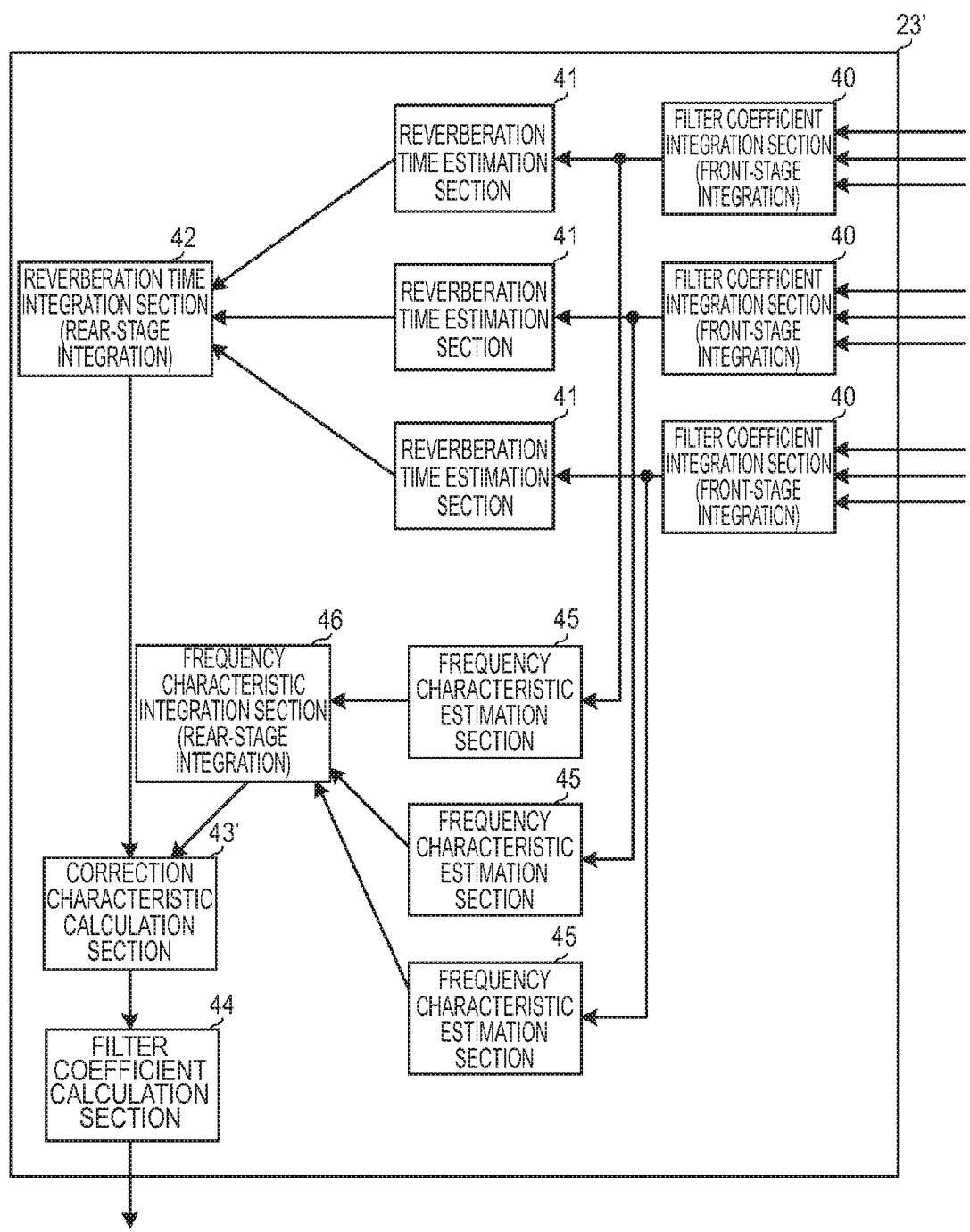
FIG. 12 is a view showing an embodiment in which a frequency characteristic correction function is added to the parameter estimation section.

FIG. 12 shows a modification example of the parameter estimation section. The parameter estimation section 23' shown in this figure determines the correction characteristic for correcting the frequency characteristic in addition to the correction characteristic for suppressing reverberation and sets the characteristics to the filter 24. In FIG. 12, the sections having the same configurations as those shown in FIG. 7 are designated by the same numerals, and their descriptions are omitted. The parameter estimation section 23' shown in this figure further includes frequency characteristic estimation sections 45 for the respective sound collection devices 11 and a frequency characteristic integration section 46 in addition to the configuration of the parameter estimation section 23 shown in FIG. 7.

The widely directional (non-directional) estimated impulse response for each sound collection device 11, output from the filter coefficient integration section 40, is input to the reverberation time estimation section 41 and is also input to the frequency characteristic estimation section 45. The frequency characteristic estimation section 45 applies a Fourier transformation to the input impulse response and calculates the frequency characteristic at the sound collection device 11. The frequency characteristic is input to the frequency characteristic integration section 46. The frequency characteristic integration section 46 synthesizes the frequency characteristics of the respective sound collection devices 11 having been input from the respective frequency characteristic estimation sections 45 and calculates the average value of the frequency characteristics in the whole conference room C. For the calculation of the average value, an arithmetic mean calculation may be performed simply or the respective frequency characteristics may be normalized and then averaged.

The frequency characteristic of the conference room C obtained by the frequency characteristic integration section 46 is input to the correction characteristic calculation section 43'. The correction characteristic calculation section 43' calculates a correction characteristic, that is, a characteristic for suppressing a frequency band having a long reverberation time and in which an emitted sound wherein the frequency characteristic affected by the conference room C is canceled reaches a listener via a flat transmission characteristic. Furthermore, this calculation method may calculate a correction characteristic in which an emitted sound reaches a listener via a given ideal transmission characteristic having been set in advance, instead of a correction characteristic in which an emitted sound reaches a listener via a flat transmission characteristic. The calculated correction characteristic is input to the filter coefficient calculation section 44. The filter coefficient calculation section 44 determines a filter characteristic so that the filter 24 has the correction characteristic calculated by the correction characteristic calculation section 43'. The calculated filter coefficient is set to the filter 24. Since the filter 24 filters a sound emission signal, the sound emitted from the speaker 26 has a characteristic such that the sound is transmitted via a flat transmission characteristic and its reverberation is suppressed, whereby the sound becomes a sound having high articulation for the participant M.

Although the front-stage integration is performed by the communication device 10 in the above-mentioned embodiment, the integration may be performed by the sound collection devices 11. In FIG. 8, the processes at S101 to S103 are preferably performed by the sound collection devices 11. Furthermore, the processes at S107 and the following steps are preferably performed by the communication device 10. The processes therebetween, that is, the processes at S104 to S106, may be performed either by the sound collection devices 11 or the communication device 10.

In the above-mentioned embodiment, although the voice conference system having a configuration in which the sound collection devices 11 includes the microphone elements 31 are connected to the communication device 10 equipped with the speaker 26 has been described, the present invention is also applicable to a voice conference system integrally equipped with the plurality of microphone elements 31 and the speaker 26 (the system being composed of only the communication device 10).

Moreover, the connection configuration between the communication device 10 and the sound collection devices 11 is not limited to wired connection. The connection configuration may be wireless connection conforming to wireless LAN or short-range wireless communication standards, for example.

What's more, the shape of the sound collection device 11 and the number of the microphone elements 31 are not limited to those shown in FIGS. 1 and 4. For example, two or four microphone elements 31 may be provided at equal intervals around the peripheral edge portion of the disc-like housing. In this case, the angle between the respective microphone elements 31 is 180 or 90 degrees. Still further, the intervals (angles) may not be equal. The microphone elements 31 may be provided while being biased in the direction toward the conference participant M.

Figure 13:
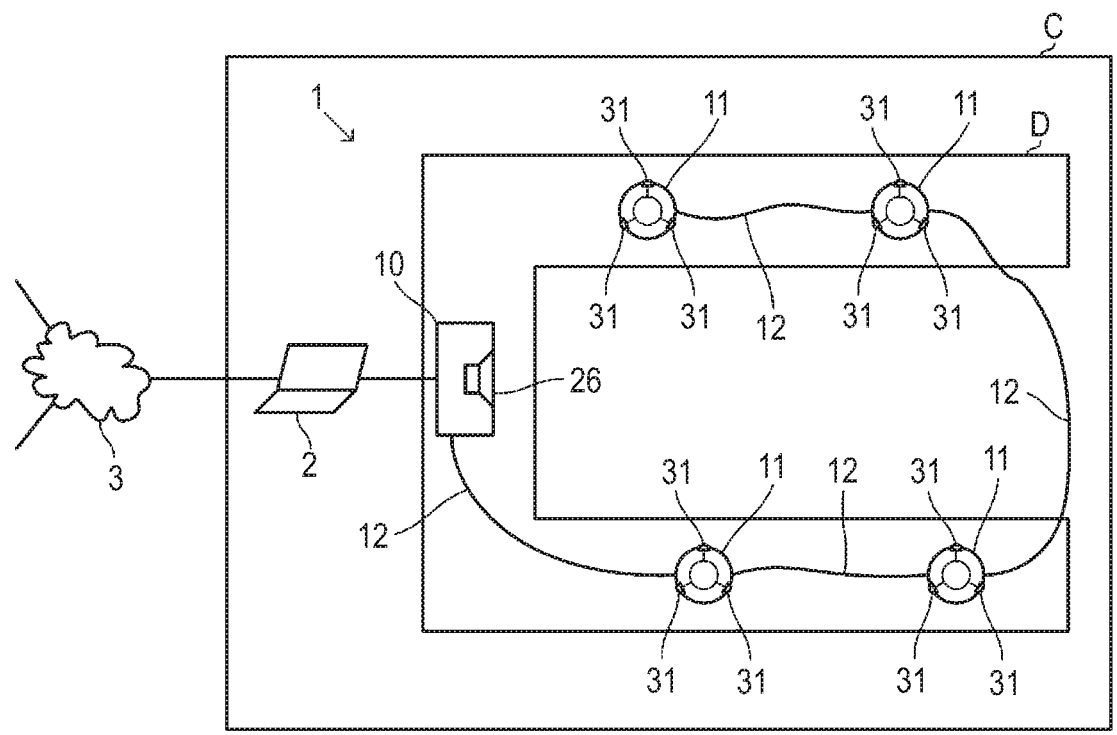
FIG. 13 is a view showing another wiring configuration of the sound collection devices of the voice conference system.

In the case that the sound collection devices 11, plural in number, are connected to the communication device 10, the sound collection devices 11 may be connected thereto by daisy chain connection using the cables 12 as shown in FIG. 13. With this connection configuration, the entire length of the cables can be reduced. In the case that the communication interfaces 21 and 34 are LAN interfaces, the interfaces can be applied to both the star connection shown in FIG. 1 and the daisy chain connection shown in FIG. 13.

Figure 14A:
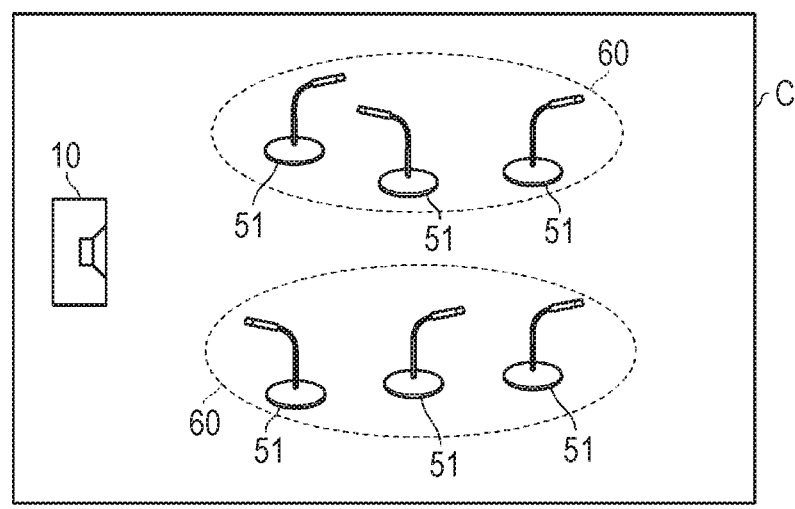
FIGS. 14(A) to 14(C) are views showing examples of the configurations of the sound collection devices in which individual microphones are grouped.
Figure 14B:
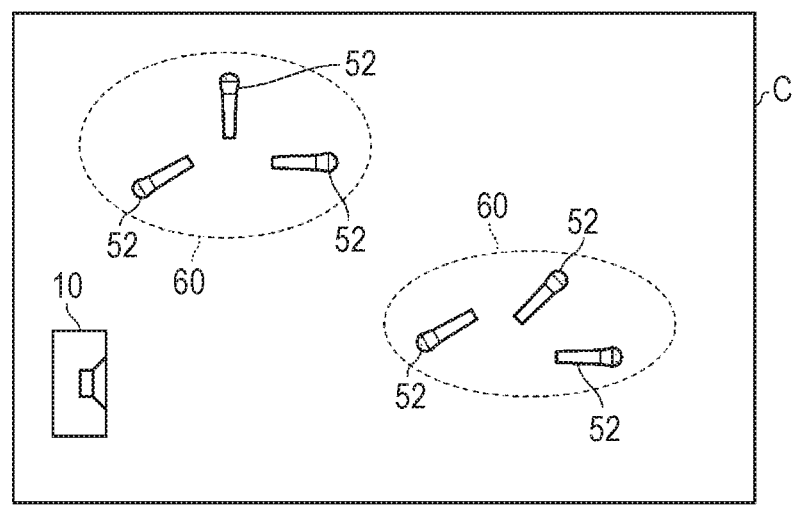
Figure 14C:
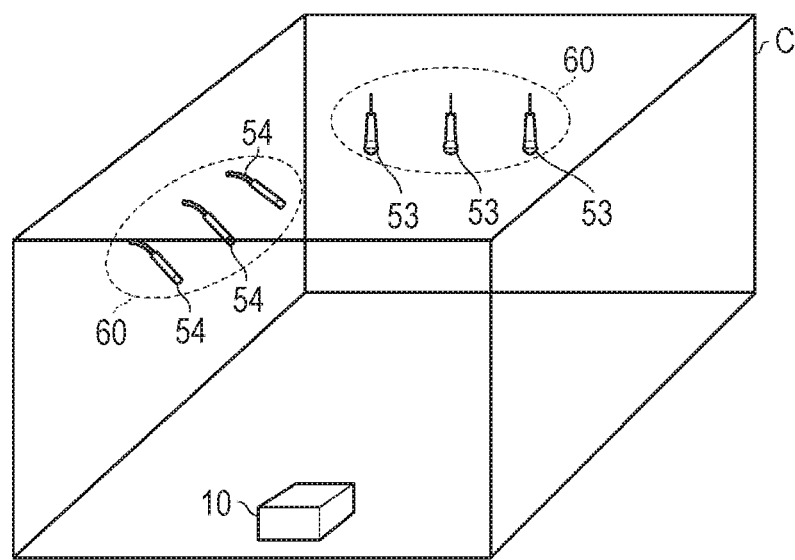

In addition, as shown in FIGS. 14(A) to 14(C), pluralities of microphones 51, 52, 53 and 54, each incorporating a single microphone element 31, may be combined (grouped) respectively, and each group 60 may be allowed to function as a single sound collection device 11. In this case, the person in charge of installation may set the grouping information of the table microphones 51 to the communication device 10 in advance, or a signal distribution section may be provided at the front end of the communication device 10 and the communication device 10 may perform the grouping by itself. In this case, for example, on the basis of the time position of the adaptive filter of the echo canceller and the correlation degree of the collected sound signal, the signal distribution section may perform the grouping so that the table microphones collecting similar signals are put in the same group.

FIG. 14(A) shows an example in which the table microphones (standing microphones) 51, plural in number, are combined into the group 60. Furthermore, FIG. 14(B) shows an example in which the hand microphones 52, plural in number, are combined into the group 60. The hand microphones 52 may be a wired type or a wireless type. In this case, since a speaking person holding the hand microphone moves, the hand microphones 52, plural in number and being present within a constant distance, may be combined into a single group 60, and an adaptive filter coefficient sequence may be added for each group 60. In the case that the groups 60 of the hand microphones 52, plural in number, are present, the above-mentioned reverberation characteristic may merely be obtained by calculating the reverberation time of each respective group. The judgment as to whether the hand microphones 52 are present within the constant distance can be made by performing position detection through the calculation of the sound collection delay difference between the two hand microphones 52 or by mutually detecting the intensity of the wireless radiation emitted from the hand microphones 52.

Moreover, the sound collection device 11 may not be a type to be placed on the conference desk D. In other words, as shown in FIG. 14(C), hanging microphones 53 hanging from the ceiling and wall-mounted microphones 54 being installed on a wall surface, for example, may also be used. The sound collection devices 11 shown in FIG. 1, the table microphones 51, the hand microphones 52, the hanging microphones 53 and the wall-mounted microphones 54 may be used mixed together as a matter of course.

Furthermore, the voice conference system 1 according to the embodiment can also be used for other than conferences as a matter of course. Moreover, the place where the system is used is not limited to conference rooms.

The sound emission and collection device according to the present invention includes a speaker, a filter for processing a sound emission signal serving as a sound signal to be supplied to the speaker, a plurality of microphones having directivity, a plurality of echo cancellers, a first integration section, a reverberation characteristic estimation section, and an operation section. The echo cancellers are provided so as to respectively correspond to the microphones, and each echo canceller cancels the regression sound signal of the sound emitted by the speaker from the sound collection signal of the microphone corresponding to the echo canceller. The first integration section integrates the adaptive filter coefficient sequence taken out from the echo canceller. On the basis of the integrated filter coefficient sequence, the reverberation time estimation section estimates the reverberation time for each frequency band in the space in which the speaker and the microphones are present. The arithmetic operation section extracts a frequency band having a long reverberation time, calculates a filter coefficient for suppressing the power of the frequency band and sets the filter coefficient to the filter.

This disclosure is summarized by way of examples as described below.

The sound emission and collection device according to the present invention includes a plurality of microphones. The microphones are, for example, directional microphones suited for conferences. Each of the microphones has an echo canceller for canceling the echo of the sound of a speaker. The echo canceller has an adaptive filter that generates a pseudo regression sound signal and has an adaptive filter coefficient (estimated impulse response) simulating the impulse response between the speaker and the microphone. Furthermore, this estimated impulse response is renewed at all times on the basis of the sound emission signal of the speaker and the sound collection signal of the microphone. Since the microphone is a directional microphone, the estimated impulse response abundantly contains only the reverberation components arriving from the direction of the directivity of the microphone, thereby not completely representing the reverberation characteristic of the entire conference room. However, since a first integration section integrates the parameters of the plurality of directional microphones, an impulse response containing the reverberation components arriving from wide range directions can be simulated although the directional microphones for conferences are used. A reverberation time is then calculated using this integrated parameter (estimated impulse response), and a filter coefficient for suppressing this reverberation is calculated. As a result, the reverberation characteristic of the entire conference room can be reproduced accurately, and the reverberation can be suppressed effectively. Furthermore, since the estimated impulse response that is used by the echo canceller to eliminate regression sound can also be used as it is, an amount to be calculated specially is not required, and it is not necessary to emit a test sound for this purpose.

For example, a plurality of microphones may be disposed in directions different from one another so that either one of the microphones has sensitivity in one of all the horizontal directions. With this arrangement of the microphones, the parameter integrated by the first integration section can be set as an almost non-directional parameter.

For example, the above-mentioned arithmetic operation section compares the threshold values of the reverberation times having been set in advance respectively for frequency bands with the above-mentioned estimated reverberation times for the frequency bands, respectively, and extracts a frequency band having the above-mentioned reverberation time exceeding the above-mentioned threshold value.

For example, in the case of the filter coefficient being set by the above-mentioned arithmetic operation section, the power for suppressing the low frequency band in the frequency band of the above-mentioned space is higher than the power for suppressing the high frequency band in the frequency band of the above-mentioned space.

For example, the above-mentioned first integration section aligns the time axes of the above-mentioned adaptive filter coefficients and simply integrates the coefficients or changes the weighing of the coefficients and integrates the coefficients.

For example, the sound collection device including the plurality of microphones and the plurality of echo cancellers and the communication device including the speaker and the filter may be separated from each other. With this arrangement, the degree of freedom in installation can be increased and the sound collection devices can be provided in plural numbers.

For example, the sound collection devices may be provided in plural numbers, the first integration sections may be provided in plural numbers so as to correspond to the plurality of sound collection devices, and a second integration section for integrating the reverberation times of the respective sound collection devices may further been provided for the reverberation time estimation section. In addition, the arithmetic operation section may calculate the filter coefficient on the basis of the reverberation time integrated by the second integration section.

As a result, the sound collection devices can be installed at a plurality of places in a room in which the device is installed, and speech sounds can be collected without omission even in a conference where many people participate. Furthermore, since the reverberation times at respective places in the room are calculated and then integrated by the second integration section, an impartial and average reverberation time can be obtained.

For example, the at least one sound collection device is formed of a plurality of sound collection devices; the first integration section is formed of a plurality of first integration sections so as to correspond to the plurality of sound collection devices; and the sound emission and collection device further includes a plurality of frequency characteristic estimation sections for calculating a plurality of frequency characteristics at the positions of the plurality of sound collection devices on the basis of a plurality of adaptive filter coefficients respectively integrated by the first integration sections of the plurality of sound collection devices and a frequency characteristic integration section for integrating the plurality of frequency characteristics calculated by the plurality of frequency characteristic estimation sections.

Although the present invention has been described in detail with reference to specific embodiments, it is obvious to those skilled in the art that various changes and modifications can be made without departing from the spirit and scope or the scope of the intension of the present invention.

The present invention is based on Japanese Patent Application (patent application 2014-083209) filed on Apr. 14, 2014, and the contents thereof are herein incorporated by reference.

INDUSTRIAL APPLICABILITY

The present invention can provide a sound emission and collection device capable of suppressing reverberation by using sound collection and echo cancelling functions for conferences without reproducing test sound in advance.

DESCRIPTION OF REFERENCE NUMERALS AND SIGNS

C . . . conference room, D . . . conference desk, M . . . conference participant, 1 . . . voice conference system, 2 . . . personal computer, 3 . . . network, 10 . . . communication device, 11 . . . sound collection device, 26 . . . speaker, 31 . . . microphone element, 51 . . . table microphone, 52 . . . hand microphone, 53 . . . hanging microphone, 54 . . . wall-mounted microphone, 60 . . . group

The invention claimed is:

1. A sound emission and collection device comprising:
a speaker;
at least one microphone;
a reverberation time estimation section configured to estimate a reverberation time for each frequency band in a space where the speaker and the at least one microphone are present; and
an arithmetic operation section configured to specify a frequency band having a long reverberation time from a sound emission signal to be supplied to the speaker based on the estimated reverberation time and to suppress power of the specified frequency band.

2. The sound emission and collection device according to claim 1, further comprising:
at least one echo canceller configured to cancel a regression sound signal of sound emitted by the speaker from a sound collection signal output by the at least one microphone,
wherein the reverberation time estimation section estimates the reverberation time for each frequency band in the space where the speaker and the at least one microphone are present based on an adaptive filter coefficient obtained from the at least one echo canceler, and
wherein the arithmetic operation section calculates a filter coefficient for suppressing the power of the specified frequency band.

3. The sound emission and collection device according to claim 2, wherein:
the at least one microphone comprises a plurality of microphones,
the at least one echo canceller comprises a plurality of echo cancellers, and
the plurality of echo cancellers respectively correspond in number to the plurality of microphones and cancel regression sound signals of sound emitted by the speaker from sound collection signals output by the corresponding microphones,
the sound emission and collection device further comprises:
a first integration section configured to integrate adaptive filter coefficients obtained from the plurality of echo cancellers,
wherein the reverberation time estimation section estimates the reverberation time for each frequency band in the space where the speaker and the plurality of microphones are present based on the integrated adaptive filter coefficients.

4. The sound emission and collection device according to claim 1, further comprising a filter configured to process the sound emission signal to be supplied to the speaker.

5. The sound emission and collection device according to claim 4, wherein the arithmetic operation section specifies the frequency band having the long reverberation time from the sound emission signal based on the estimated reverberation time, calculates the filter coefficient for suppressing the power of the specified frequency band, and sets the filter coefficient to the filter.

6. The sound emission and collection device according to claim 3, wherein each of the plurality of microphones has a directivity.

7. The sound emission and collection device according to claim 3, wherein the plurality of microphones are disposed in directions different from one another along a horizontal plane.

8. The sound emission and collection device according to claim 1, wherein the arithmetic operation section:
compares threshold values of the reverberation times having been set in advance respectively for frequency bands with the estimated reverberation times for the frequency bands, respectively; and
extracts a frequency band having a reverberation time exceeding the threshold value, among the estimated reverberation times for the frequency bands, for the respective frequency band.

9. The sound emission and collection device according to claim 5, wherein the power for suppressing a lower frequency band is higher than the power for suppressing the high frequency band in the filter coefficient set to the filter.

10. The sound emission and collection device according to claim 3, wherein the first integration section aligns time axes of the adaptive filter coefficients, and simply integrates the adaptive filter coefficients or integrates while changing weighing of the adaptive filter coefficients.

11. The sound emission and collection device according to claim 3, further comprising:
at least one sound collection device that includes the plurality of microphones and the plurality of echo cancellers; and
at least one communication device that includes the speaker and the filter,
wherein the at least one sound collection device and the at least one communication device are separated from each other.

12. The sound emission and collection device according to claim 11, wherein:
the at least one sound collection device comprises a plurality of sound collection devices each including the first integration section,
each of the reverberation time estimation section includes a second integration section that integrates the reverberation time of the respective sound collection device, and
the arithmetic operation section calculates the filter coefficients based on the reverberation times integrated by the second integration sections.

13. A method of controlling a sound emission and collection device having a speaker and at least one microphone, the method comprising:
a processing step of processing, using the sound emission and collection device, a sound emission signal to be supplied to the speaker;
an estimating step of estimating, using the sound emission and collection device, a reverberation time for each frequency band in a space where the speaker and the at least one microphone are present; and
a setting step of specifying, using the sound emission and collection device, a frequency band having a long reverberation time from the sound emission signal based on the estimated reverberation time, and suppressing power of the specified frequency band.

14. The method according to claim 13, further comprising:
a cancelling step of, using at least one echo canceller of the sound emission and collection device, canceling a regression sound signal of sound emitted by the speaker from a sound collection signal output by the at least one microphone,
wherein the estimating step estimates a reverberation time for each frequency band in the space where the speaker and the at least one microphone are present based on an adaptive filter coefficient obtained from the at least one echo canceller, and wherein the setting step calculates a filter coefficient for suppressing the power of the specified frequency band.

15. The sound emission and collection method according to claim 14, wherein:

the at least one microphone comprises a plurality of the microphones, the at least one echo canceller comprises a plurality of echo cancellers, the plurality of echo cancellers respectively correspond in number to the plurality of microphones, and the cancelling step cancels regression sound signals of sound emitted by the speaker from sound collection signals output by the corresponding microphones, the sound emission and collection method further comprises an integrating step of integrating adaptive filter coefficients obtained the plurality of echo cancellers, wherein the estimating step estimates the reverberation time for each frequency band in the space where the speaker and the plurality of microphones are present based on the integrated adaptive filter coefficients.

16. The sound emission and collection method according to claim 13, wherein the processing step processes, with a filter, the sound emission signal to be supplied to the speaker.

17. The sound emission and collection method according to claim 16, wherein the setting step specifies the frequency band having the long reverberation time from the sound emission signal based on the estimated reverberation time, calculates the filter coefficient for suppressing the power of the specified frequency band, and sets the filter coefficient to the filter.

18. The sound emission and collection method according to claim 13, wherein the setting step:

compares threshold values of the reverberation times having been set in advance respectively for frequency bands with the estimated reverberation times for the frequency bands, respectively; and extracts a frequency band having a reverberation time exceeding the threshold value, among the estimated reverberation times for the frequency bands, for the respective frequency band.

19. The sound emission and collection method according to claim 17, wherein the power for suppressing a lower frequency band is higher than the power for suppressing a higher frequency band in the filter coefficient set to the filter.

20. The sound emission and collection method according to claim 15, wherein the integrating step aligns time axes of the adaptive filter coefficients, and simply integrates the adaptive filter coefficients or integrates while changing weighing of the adaptive filter coefficients.

* * * * *